Patented Oct. 7, 1952

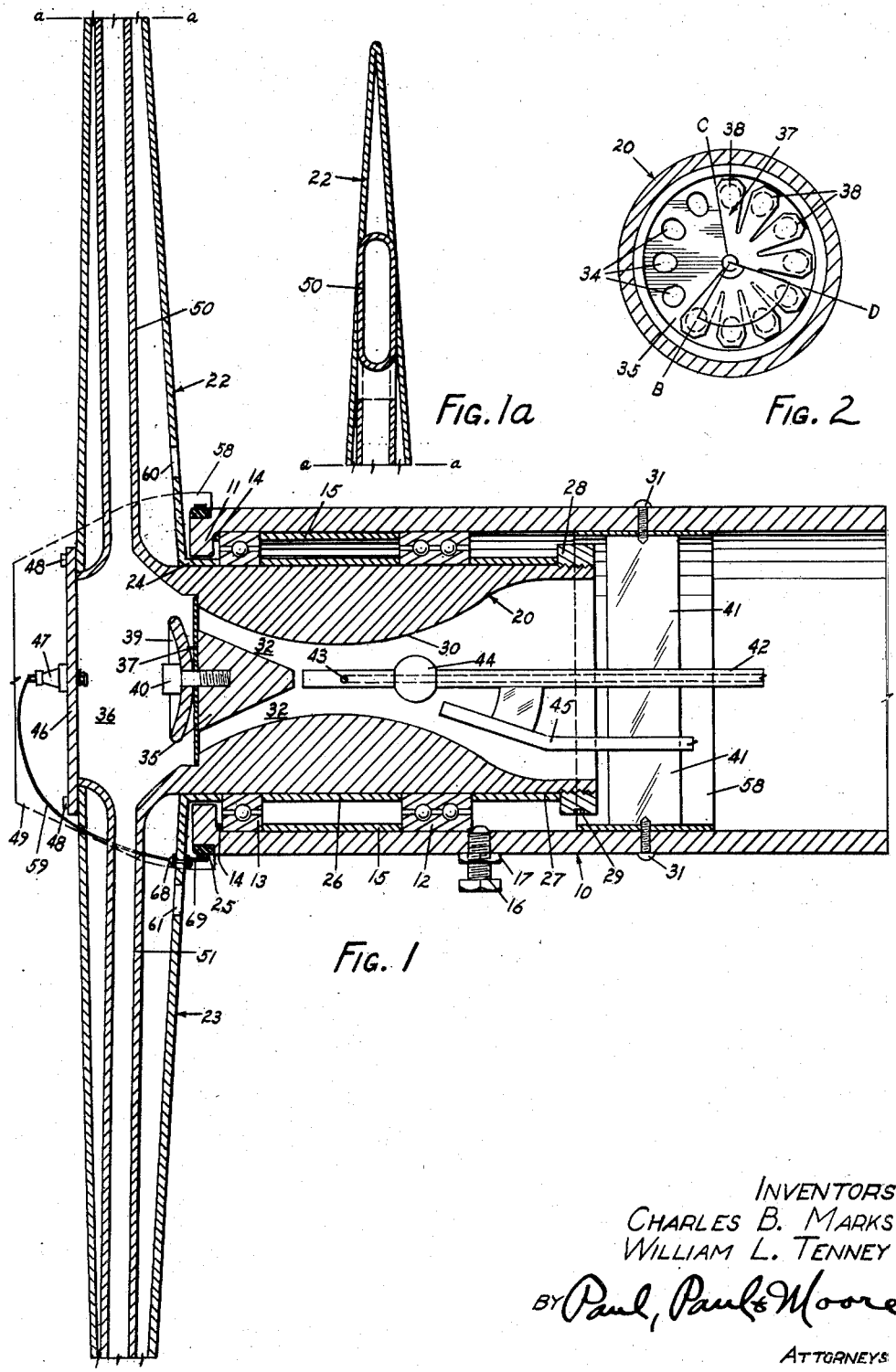

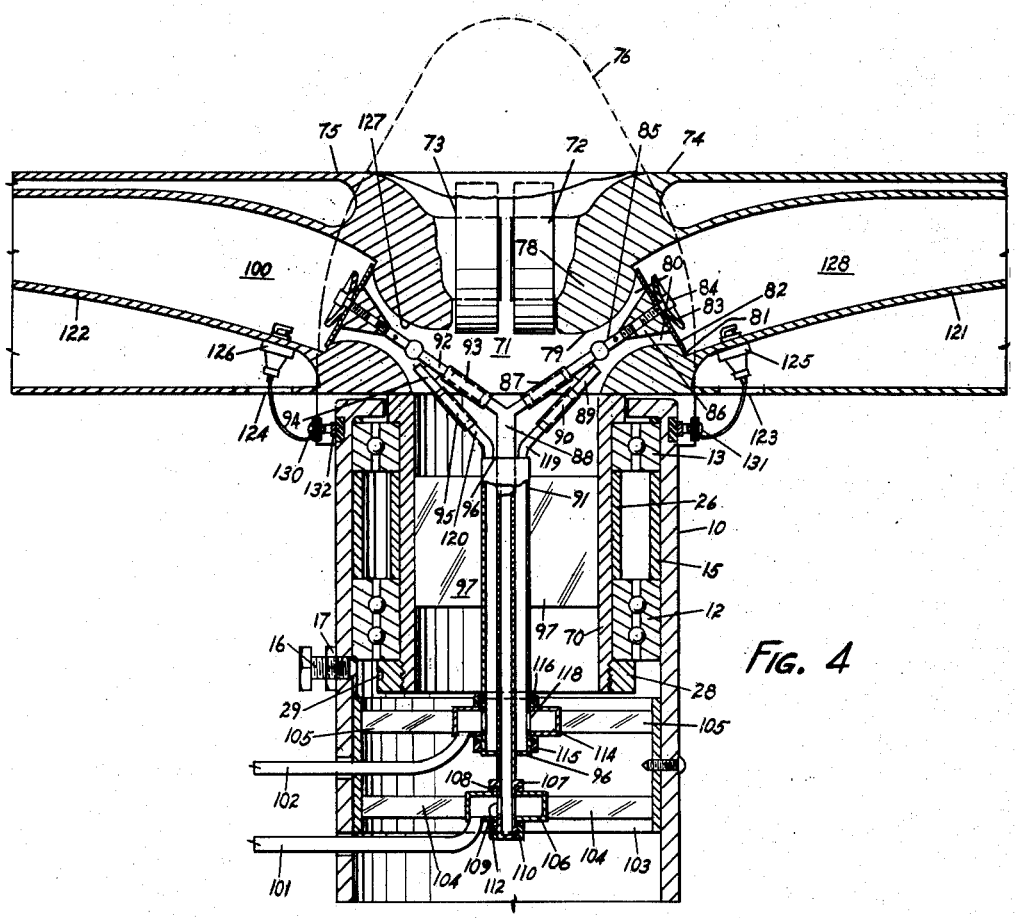

2,612,955

UNITED STATES PATENT OFFICE 2,612,955

AIR SCREW, INCLUDING A RESONANT PULSE JET SYSTEM

William L. Tenney, Crystal Bay, Minn., and Charles B. Marks, Las Vegas, Nev.; said Marks assignor to said Tenney Application March 5, 1947, Serial No. 732,620

8 Claims. (Cl. 170—135.4)

1

This invention relates to air screws, and more particularly to an air screw or propeller which is self-powered to be driven by jet engines incorporated within the blades or hub of the air screw. In the conventional air screw, the power for rotating it is provided by a separate engine and is communicated to the air screw by a conventional drive shaft. In the present invention the air screw is driven by engines of the jet type incorporated within the blade and the hub structure of the air screw itself, thus dispensing with any need for a separate engine.

It is an object of the present invention to provide an improved air screw having a self-contained jet engine for rotating same. It is a further object of the invention to provide an air screw of improved construction having a self-contained engine in the hub or rotating shaft mounting of the air screw. It is a further object of the invention to provide an improved variable pitch propeller driven by a self-contained jet engine located within the propeller blades.

Other and further objects of the invention are those inherent in the apparatus herein illustrated, described and claimed.

The invention is illustrated with reference to the drawings in which

Figure 1 is a sectional view of one form of the invention, Figure 1-a being the fragmentary tip portion of the propeller blade which it is understood fits along the line a—a of Figure 1, inasmuch as a sufficiently large sheet for the drawings is not available;

Figure 2 is a fragmentary detail partly in section and partly broken away showing the valve plate of the jet engine;

Figure 3 is a front elevational view of an air screw made in accordance with the present invention and is illustrative of the type shown in Figure 1 or the type shown in Figure 4; and Figure 4 is a second form of the invention showing variable pitch propellers and the manner in which the jet engine is incorporated therein.

Throughout the drawings corresponding numerals refer to the same parts.

Referring to the drawings, particularly Figures 1-3, the apparatus includes a motor frame generally designated 10 which may be a portion of an airplane fuselage, wing or tail structure or any suitable frame portion of either of these devices, or any frame on which the air screw is mounted. In the illustrated form the frame is tubular and is provided with an inturned end flange 11. Within the tubular frame 10 there are mounted a plurality of ball-bearing assemblies 12 and 13 which are maintained in spaced relation by the sleeve 15 and washer 14. Two or more taper pointed set screws 16 provided with lock nuts 17 bear against the outer race of bearing 12 thus forcing it into engagement with the sleeve 15, and the latter into engagement with the outer race of bearing 13 which, in turn, bears against a washer 14 seated against the inner surface of the flange 11, thus holding the bearings in fixed assembly. The inner races of the bearing serve rotatably to support a hollow shaft generally designated 20. The propeller blades are illustrated generally at 22 and 23 and are fixed to the outer end of the shaft 20 in any suitable manner not illustrated. The blades may be formed with a collar portion 24, or a separate collar may be provided at this point and fastened to the shaft. Alternatively, the portion 24 may be a flange on the shaft 20. Portion 24 serves as a stop against which the inner race of bearing 13 is situated, it being held in this position by a sleeve 26 which is in turn held by the inner race of bearing 12 and the latter held by another sleeve 27 which is fastened by means of the threaded collar 28. The threaded collar 28 is provided with a plurality of wrench apertures at 29 by means of which the collar may be screwed off. When this is done the entire shaft portion 20 may be withdrawn from the bearing assembly.

The interior of the hollow shaft 20 is an air and fuel inlet for the jet engine hereinafter described, and is provided with a Venturi section 30 leading into a plurality of individual passageways 32 which terminate as ports 34 in the valve surface 35 of the combustion chamber 36. Over the ports is situated a petal shaped valve generally designated 37 having a plurality of individual valve leaf fingers 38 which cover the individual ports. These elements are best shown in Figure 2 wherein the portion between radii B and C shows the apertures 34 in valve plate 35; the portion between radii C and D shows the manner in which the valve 37 has petals 38—38 overlying the ports; and the portion between radii D and B shows the overlying valve backstop which partially covers the valve and port area. The valve 37 is held in place by a valve backstop 39 which is fastened by a single cap screw 40. The rear surface of the valve backstop is curved.

Within the frame 10 there is mounted a sleeve 58 which is held in place by a plurality of screws 31. Extending radially inward from the sleeve are one or more radial vanes 41 which serve to support an axial fuel inlet pipe 42 which extends into the Venturi section 30. The pipe terminates in fuel jet orifices 43. Upon the pipe there is a ball-shaped section 44 and upon the pipe there is also mounted a starting air jet pipe 45 which is situated so as to blow a jet of air over the ball 44 and across the fuel jet nozzles 43.

The pulse jet engine herein described, including combustion chamber 36, jet pipes 50 and 51, valve 37, valve backstop 39, the Venturi section 30 and the individual inlet tubes 32 and also the air and fuel inlet pipes 42 and 45, is an adaptation of the pulse jet engines shown in greater detail in application Serial No. 649,832 filed February 25, 1946, to which reference is here made. The construction of the jet engine per se forms no part of the present invention.

The front of the combustion chamber 36 is covered by a plate 46 which is held in place by a plurality of screws 48, and the entire hub section of the shaft 20 and blades 22 and 23 is preferably covered by means of a nose piece 49 of streamline form. The nose piece 49 is either perforated or may be cut with louvers to allow the entrance of cooling air against the combustion chamber. The air, when heated by contact with the combustion chamber, leaves via the space 58. The plate 46 is equipped with a starting igniter plug 47 which is connected through an insulated lead wire 59 to an insulated stud 68 which extends through the back wall of blade 23. The stud carries a spring brush 69 which bears against an insulated slip ring 25 on frame tube 10. A high tension lead is connected to ring 25 which then communicates ignition voltage through brush 69, stud 68 and wire 59 to spark plug 47, regardless of whether the propeller is stationary or spinning. This allows re-starting in flight.

From the combustion chamber 36 there extend jet tubes which are positioned so as to lie within the confines of the hollow propeller blades 22 and 23. Thus, jet tube 50 extends outwardly within the hollow propeller blade 22 and jet tube 51 extends outwardly within the hollow propeller blade 23. Near the base of the propeller blades, where the thickness is sufficiently great, the jet tubes may be of circular cross section, but as the tube approaches the tip end of the blades where the blades are relatively thinner, the jet tube may be of somewhat flattened cross section so as not to interfere with the desired air foil cross section of the propeller blade itself. As illustrated in Figures 1a and 3, adjacent the tips of the propeller blades the jet tubes are curved so that they emerge from the trailing edges 53 of blade 22 and 54 of blade 23 in a direction nearly tangential to the direction of rotation. At this portion also the jet tube is considerably flattened and has a longitudinal section as shown in Figure 1 and is even flattened more where the jet tube emerges from the trailing edge of the propeller blade. A compromise between best air foil and the necessity of maintaining thickness of the jet tube is made at the point of emergence of the jet tube from the trailing edge of the blade so as to provide adequate cross sectional area of the jet tube. We have found that greatest efficiency of a pulse jet engine is accomplished when the cross sectional area of the jet tube is gradually increased towards the jet end of the tube, as illustrated with particularity in application Serial No. 661,280 filed April 11, 1946 which matured into Patent No. 2,587,100 on February 26, 1952, to which reference is here made, and therefore it is desirable somewhat to increase the cross sectional area of the jet tubes 50 and 51 toward their point of emergence from the propeller blades.

In operation a fuel line is connected to pipe 42 and starting air under pressure is connected to the pipe 45. A high tension electrical connection is then made to ring 25, preferably from an ordinary automotive vibratory spark coil capable of providing a continuous spark. The flow of starting air under pressure draws fuel from the orifices 43 and the fuel-air mixture passes through the passages 32, lifts the individual valve petals 38 and the mixture thus enters the combustion chamber 36 where ignition takes place. The ensuing explosion forces the products of combustion out the jet tubes 50 and 51 where the jet efflux, which emerges in the direction of arrows 56 and 57 (Figure 3), causes a reaction force upon the propeller blades tending to rotate them. The combustion chamber and jet tubes are resonant in their action. That is to say, when fuel and air are introduced into the combustion chamber 36, ignition occurs exploding and driving the combustion gases out through the resonant jet tubes 50 and 51. When the jet exhaust emanates from the tips of the tubes, a negative pressure tends to develop in the combustion chamber behind the outflowing exhaust and additional combustion air and fuel is drawn into the combustion chamber or chambers, and is again exploded and the cycle repeated over and over again at a relatively high frequency corresponding to the resonant length of the tube and combustion chamber system. Thus, in some instances the frequency of resonant combustion in the combustion chamber and resonant exhaust tubes may be as high as 300 cycles per second for relatively short tubes and a lesser frequency corresponding to longer tubes. The ignition may be discontinued once combustion is initiated and the reaction of the jet engine is such that starting air at pipe 45 may likewise be discontinued, for once the engine is started the explosions take place at high frequency, each explosion serving to draw air through the venturi 30 which causes adequate fuel to be likewise drawn into the stream at the orifices 43. The individual petals of the valve plate vibrate back and forth from their seating position to their position against the center surface of the valve backstop 39 at a high frequency, as determined by the volume of the combustion chamber and the length and other dimensions of the jet tubes. Once combustion has been initiated, it is therefore only necessary to provide fuel at pipe 42 and power will continue to be generated. The ignition and starting air are therefore disconnected as soon as combustion is started, the propeller is released and the reaction force of the jet tubes quickly drives the propeller blades 22 and 23 at a high rate in the direction of arrow 67. No warm-up period is required and the device is therefore ready to be used immediately. The resonant action of the combustion chamber and resonant jet tubes takes place, regardless of whether or not the air screw, in which the power unit is incorporated, happens to be rotating. This is of exceedingly great importance in air screws because it permits the air screw to be started from a stand-still without initially "cranking." Furthermore, if the air screw is turning idle but still not powered, power can be supplied by initiating the action of the resonant combustion chamber-jet tube system by introducing starting air and fuel into the combustion chamber and thereafter power is instantly applied at full rate and the air screw becomes powered and no longer idles.

If desired, an air inlet may be provided into the hollow space of the propeller blades around the jet tubes, as indicated at 60 and 61, so as to permit cooling air to be drawn into the interior of the propeller blades and over the exterior surface of the jet tubes. The jet tubes may likewise preferably be extended slightly beyond the surface of the trailing edges 53 and 54 of the blades, as shown in Figure 3, and apertures or an annular space left around the jet tube as indicated at 63 and 64 for tube 50 and 65 and 66 for tube 51. The cooling air which thus traverses the length of the hollow propeller emerges around the jet and serves not only to prevent undesirable heating of the propeller blade and jet tube surface, but also provides to some extent a jet effect which assists in the efficiency of the power unit.

The apparatus illustrated in Figure 4 is similar to that shown in Figure 1, except that individual combustion chambers are provided in each of the propeller blades and, if desired, the propeller blades may be made rotatable through a given angle for varying the pitch thereof. In the embodiment shown in Figure 4, the frame 10, bearings 12 and 13 and their method of fastening to the propeller shaft and frame may be identical with that shown in Figure 1 and therefore need not be further described. In this embodiment, however, the hollow propeller shaft 70 constitutes an air passage and extends forwardly to a hub section generally designated 71 which is provided with bearings 72 and 73 upon which the propeller blades 74 and 75 are mounted for rotation throughout a limited angle for varying the pitch of the blades. The bearing structure 72—73 and mechanism for varying the pitch of the propellers may be of standard design and therefore need not be further described other than to say that the propeller blades 74 and 75 may have their pitch angle varied through the pitch changing mechanism not illustrated, where variable pitch is desired. If desired, the bearings 72 and 73 and the pitch changing mechanism, not illustrated, may be eliminated and the propeller blades 74 and 75 may be fixedly mounted upon the hub 71 after the manner shown in Figure 1. In this embodiment also the hub portion of the propeller is provided with a decorative and streamlined nose piece 76 which is perforated or louvered to allow ventilating and cooling air to flow over the hot combustion chambers.

The base of each of the blades 74 and 75 is identical and therefore only one need be described. Thus, blade 74 is provided with a Venturi-shaped air inlet portion 79 which blends into a plurality of tubular passageways 80 which terminate in ports on the valving surface 81, these ports being in turn covered by a valve plate 82 which is held in place by a valve backstop 83 and cap screw 84, as shown in Figures 1 and 2. In this instance the fuel inlet tube 85 is screwed into the central portion 86 of the valve plate, since it is movable therewith when the propeller pitch angle is made variable, and extends back through a flexible connection at 87 to the Y-shaped pipe 88. Similarly, the starting air inlet line 89 extends through a flexible connection 90 to the concentric tube 91. The corresponding fuel inlet pipe 92 serving the combustion chamber 100 of blade 75 likewise extends back through the flexible connection 93 to the second tube of the Y-shaped pipe 88 and the starting air inlet tube 94 likewise extends back through the flexible tube 95 and is connected to the concentric tube 91. End walls 96 in the tube 91 serve centrally to locate the tube 88 and form a chamber between the tubes. The tube 91 is supported by two or more radial plates 97 extending from the interior of the shaft 70 to the axially located tube 91. Tube 88 being concentric with tube 90 is likewise axially supported. Concentric rotatable connections to the tubes 88 and 91 from their stationary supply lines 101 and 102 may be made in any convenient manner. As illustrated, these connections are in the following form:

Within the stationary frame 10 there is a sleeve 103 having a plurality of radial supports 104 and 105. The supports 104 serve to hold a central stationary cylindrical box 106 to which fuel supply line 101 connects. The tube 88 is provided with a flange at 107 which is separated by the gland washer 108 from one of the walls of the box 106, a second gland washer being provided at 109. An end cap nut 110 on the tube 88 serves to put a slight pressure on the washer 109 and thence through the box 106, which is capable of slight deflection, to the washer 108 which rotates against the flange 107. One or more ports 112 in the wall of tube 88 serve to communicate the interior of the box 106 to the interior of the tube 88 as the latter is rotated.

The radial supports 105 likewise support a hollow box 114 which is similarly connected to the tube 91 by means of the squeeze nut 115 at the end and gland washers which separate the nut and the flange 116 on the tube 91 from the walls of the box. Starting air entering line 102 therefore enters the box and passes through ports 118 and into the interior of the tube 91 and thence through the connections 119 and 120 and through the flexible connections 90 and 95 to the starting air blast tubes 89 and 94.

From the combustion chamber 128 in propeller 74 there extends a jet tube 121 which extends outwardly in the same manner as illustrated in Figure 3 and terminates in a jet exhaust port in the trailing edge of the propeller blade 74 adjacent the end of the blade. Similarly, from the combustion chamber 100 the jet tube 122 extends outwardly through the blade 75 and likewise terminates in the jet exhaust port in the trailing edge of blade 75 adjacent the tip of that blade.

It may be pointed out in respect to either of the modifications shown in Figures 1 and 4 that, if desired, the jet tubes may extend outwardly beyond the tips of the propeller blades themselves and curved to an exhaust port in a trailing direction in respect to the blade. This is desirable in some instances so as to provide a maximum velocity at the exhaust tip of a jet tube for best efficiency of the jet efflux.

The propeller blades 74 and 75 are provided with ports 123 and 124 which give access to the spark plugs 125 and 126 situated within the confines of the blade, and also provide entrance for cooling air around the combustion chamber and jet tube. Plugs 125 and 126 are connected through lead wires to a pair of brush holders 130 and 131 which are mounted in insulated relationship upon the rear edge of decorative nose piece 76. Each brush holder carries a brush which is spring pressed against a slip ring 132 which is mounted in insulated relationship upon frame piece 10. An ignition circuit is connected to ring 132 and hence through it the brushes and brush holders to plugs 125 and 126. Ignition is thus provided at all times regardless of whether the propeller is stationary or turning. The ignition wire connections between brush holders 130—131 and plugs 125—126 do not restrict pitch changing movement of the blades.

The cooling air which enters at plug openings 123—124 passes outwardly within the blade and is exhausted adjacent the termination of the jet pipe in the trailing edge of the blade.

In operation, ignition wires are connected to the ring 132 and a fuel line is then connected to pipe 101 which thus permits fuel to flow through the gland box and then tube 88 and thence through the fuel inlet tubes 87 and 92 to the fuel jets therein. Starting air under pressure is then applied to the pipe 102 which introduces the fuel mixture through the Venturi sections 79 and 127 and thence through the valve mechanism of each jet engine into the combustion chambers 100 and 128 where combustion takes place, as previously described with reference to Figure 1. As soon as combustion is initiated, the ignition and the starting air are discontinued and rotation of the propeller blades 74 and 75 begins. Where the blades 74 and 75 are fixedly mounted on the hub 70, the flexible connections 87, 90, 93 and 95 may be eliminated; but where the blades 74 and 75 are rotatable slightly for varying the pitch, these connections are included so as to provide fuel feed to the accurately positioned fuel inlet pipes 85 and 92, regardless of the pitch angle to which the blades 74 and 75 may be adjusted.

For throttling, either of the units of Figures 1 or 4 may be provided with air and fuel valves so as to reduce the amount of combustion mixture going into the combustion chamber or chambers. Likewise, for suitable carburetion the fuel supply lines 42 or 101 may be connected to a conventional bowl or to a pressure line supplying fuel under slight but uniform pressure. In some instances the jet tubes may occupy the entire interior of the blade and form the blade itself, being shaped suitably in cross-section for propeller blade purposes.

The invention is especially applicable to vertical or nearly vertical axis propellers used in helicopters, in which case the pitch changing mechanism, if used (of Figure 4) could be (optionally) of the cyclic pitch change type such as is desirable in helicopter vanes.

As many apparently widely different embodiments of this invention may be made without departing from the spirit and scope thereof, it is to be understood that we do not limit ourselves to the specific embodiments herein except as defined by the appended claims.

What we claim is:

1. A self-powered rotary air screw capable of being powered while the screw is static or rotating comprising a hub and hollow shaft assembly mounted for rotation, airfoil propeller blades mounted on the shaft for rotation therewith, and a resonant pulse jet system including combustion chamber means in said hub and shaft assembly and having jet exhaust tubes internally of the propeller blades opening in substantially unrestricted relation directly into said combustion chamber and extending outwardly within said blades forming with said combustion chamber integral parts of a system resonant in gases, pressure responsive valve means located adjacent and in direct pressure responsive relation with said combustion chamber for periodic operation under the action of and in timed relation with the resonant pulsating action of the gases in said system, and means for discharging the periodic pulse jets from said exhaust tubes and the blade contour adjacent the tips of said propeller blades to develop thrust for effecting rotation of said air screw.

2. The apparatus of claim 1 wherein the combustion chamber means is axially of the hollow shaft and the jet tubes extend outwardly therefrom through the interior of the blades.

3. The apparatus of claim 1 wherein the blades are mounted for axial rotation in respect to the hollow shaft for varying the pitch of the blades, and means is provided on said hollow shaft for thus varying the pitch, said combustion chamber means comprising individual combustion chamber in each blade having an air and fuel inlet connection thereto through the hollow shaft.

4. A self-powered rotary air screw assembly capable of being powered while the air screw is static or rotating comprising a hollow shaft and bearing means for rotatably mounting the same, a plurality of airfoil propeller blades extending outwardly from said hub and rotatable therewith, said hollow shaft constituting an air inlet passage, a resonant pulse jet system including combustion chamber means adjacent the point of connection of the blades to said hub and having an air inlet passage from said hub, means for feeding fuel and air into said combustion chamber means, jet exhaust tubes internally of the propeller blades opening in substantially unrestricted relation directly into said combustion chamber and extending outwardly within said blades forming with said combustion chamber integral parts of a system resonant in gases, pressure responsive valve means located adjacent and in direct pressure responsive relation with said combustion chamber for periodic operation under the action of and in timed relation with the resonant pulsating action of the gases in said system, and means for discharging the periodic pulse jets from said exhaust tubes and the blade contour adjacent the tips of said propeller blades to develop thrust for effecting rotation of said air screw.

5. The apparatus of claim 4 further characterized in that the air passageway through the shaft is provided with a Venturi section and a fuel feeding nozzle mounted on the frame and extending into said Venturi section.

6. A self-powered rotating air screw capable of being powered while the screw is static or rotating comprising a frame, a hollow shaft journalled on the frame, a plurality of air foil propeller blades mounted on the shaft and rotatable therewith, a resonant jet combustion chamber within the portion of each blade adjacent the hollow shaft, each combustion chamber having a resonant jet tube extending outwardly within the blade and terminating in a jet nozzle on the trailing edge of the blade adjacent the tip thereof, an air inlet passage in each blade communicating with the hollow shaft, a fuel feed jet in each passage rotatable with the shaft, and a rotatable connection from a fuel feed line on the frame to the fuel feed jets in each air passage, valve means operable directly in response to the resonant operation of said resonant jet means, and means including said valve means for introducing fuel and combustion air into said combustion chamber.

7. The apparatus of claim 6 further characterized in that the blades are rotatably mounted in respect to the shaft for varying the pitch thereof, and a flexible fuel feeding connection is provided between the fuel feed jets in each air passage, and a fuel feed line in the rotating shaft.

8. The apparatus of claim 6 further characterized in that each fuel jet is provided with an adjacent starting air pipe, all of the said starting air pipes being connected through a second rotatable connection to a stationary starting air line on the frame.

WILLIAM L. TENNEY.
CHARLES B. MARKS.

REFERENCES CITED

The following references are of record in the file of this patent:

UNITED STATES PATENTS

| Number | Name | Date |
|---|---|---|
| 1,099,083 | Duc | June 2, 1914 |
| 1,133,660 | Papin et al. | Mar. 30, 1915 |
| 1,519,444 | Fales | Dec. 16, 1924 |
| 1,983,405 | Schmidt | Dec. 4, 1934 |
| 2,371,687 | Gerhardt | Mar. 20, 1945 |
| 2,397,357 | Kundig | Mar. 26, 1946 |

FOREIGN PATENTS

| Number | Country | Date |
|---|---|---|
| 227,151 | Great Britain | Jan. 12, 1925 |
| 366,450 | Great Britain | of 1930 |
| 386,908 | Great Britain | Jan. 26, 1933 |
| 408,033 | France | Jan. 14, 1910 |
| 648,107 | France | Aug. 7, 1928 |

OTHER REFERENCES

Article "Wasted Talent," pp. 364–367 and 370 of "Flight," October 5, 1944.